US007966038B2

(12) United States Patent
Shiga et al.

(10) Patent No.: US 7,966,038 B2
(45) Date of Patent: Jun. 21, 2011

(54) WIRELESS AUDIO TRANSFER SYSTEM, WIRELESS MICROPHONE, AUDIO TRANSMITTING APPARATUS, AUDIO RECEIVING APPARATUS, IMAGE PICKUP APPARATUS, RECORDING APPARATUS, AND AUDIO MIXER

(75) Inventors: Yoshihito Shiga, Shizuoka (JP); Iwao Tajima, Shizuoka (JP); Shosuke Sekikawa, Shizuoka (JP)

(73) Assignee: Sony Corporation, Tokyo (JP)

( * ) Notice: Subject to any disclaimer, the term of this patent is extended or adjusted under 35 U.S.C. 154(b) by 592 days.

(21) Appl. No.: 12/061,119

(22) Filed: Apr. 2, 2008

(65) Prior Publication Data

US 2008/0247571 A1 Oct. 9, 2008

(30) Foreign Application Priority Data

Apr. 4, 2007 (JP) ................................ P2007-098597

(51) Int. Cl.
*H04M 1/00* (2006.01)

(52) U.S. Cl. ............... 455/556.1; 455/569.1; 455/550.1; 370/329; 370/338

(58) Field of Classification Search ............... 455/556.1, 455/569.1; 370/329, 338
See application file for complete search history.

(56) References Cited

U.S. PATENT DOCUMENTS

| | | | | |
|---|---|---|---|---|
| 2004/0147283 | A1 * | 7/2004 | Lee | 455/556.1 |
| 2005/0083879 | A1 * | 4/2005 | Peek | 370/329 |
| 2005/0181825 | A1 * | 8/2005 | Wu | 455/556.1 |
| 2007/0037606 | A1 * | 2/2007 | Ganley et al. | 455/569.1 |

FOREIGN PATENT DOCUMENTS

| | | |
|---|---|---|
| CN | 2476148 | 2/2002 |
| CN | 1905630 | 1/2007 |
| JP | 11-212758 | 8/1999 |
| JP | 2002-9654 | 1/2002 |
| JP | 2002-78037 | 3/2002 |
| JP | 2003-259172 | 9/2003 |
| JP | 2007 36735 | 2/2007 |

* cited by examiner

*Primary Examiner* — Lewis G West
*Assistant Examiner* — April G Gonzales
(74) *Attorney, Agent, or Firm* — Frommer Lawrence & Haug LLP; William S. Frommer; Paul A. Levy

(57) ABSTRACT

Disclosed is a wireless audio transfer system. The wireless audio transfer system includes an audio transmitting apparatus including a microphone and a modulating/transmitting unit for transmitting radio waves modulated using an audio signal from the microphone, an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit, and an image pickup apparatus including an audio input terminal for inputting the audio signal outputted from the audio receiving apparatus. In this wireless audio transfer system of the embodiment, the audio transmitting apparatus includes a connection terminal and a data transmitting unit, the audio receiving apparatus includes a first communication terminal and a data processing unit, and the image pickup apparatus includes a second communication terminal and a control unit.

7 Claims, 12 Drawing Sheets

| OPERATION | CONTROL DATA |
|---|---|
| MOUSE LEFT CLICK | START RECORDING |
| MOUSE RIGHT CLICK | STOP RECORDING |

| OPERATION | CONTROL DATA |
|---|---|
| UP CURSOR KEY 「↑」 | RAISE OUTPUT VOLUME |
| DOWN CURSOR KEY 「↓」 | LOWER OUTPUT VOLUME |
| RIGHT CURSOR KEY 「→」 | RAISE INPUT VOLUME |
| LEFT CURSOR KEY 「←」 | LOWER INPUT VOLUME |
| "1" KEY | MIX AUDIO |
| "2" KEY | NO MIXING |

FIG. 12A

| OPERATION | FREQUENCY OF TONE SIGNAL |
|---|---|
| MOUSE LEFT CLICK | F1 |
| MOUSE RIGHT CLICK | F2 |

FIG. 12B

| FREQUENCY OF TONE SIGNAL | CONTROL DATA |
|---|---|
| F1 | START RECORDING |
| F2 | STOP RECORDING |

WIRELESS AUDIO TRANSFER SYSTEM, WIRELESS MICROPHONE, AUDIO TRANSMITTING APPARATUS, AUDIO RECEIVING APPARATUS, IMAGE PICKUP APPARATUS, RECORDING APPARATUS, AND AUDIO MIXER

CROSS REFERENCES TO RELATED APPLICATIONS

The present invention contains subject matter related to Japanese Patent Application JP 2007-098597 filed in the Japanese Patent Office on Apr. 4, 2007, the entire contents of which being incorporated herein by reference.

BACKGROUND OF THE INVENTION

1. Field of the Invention

The present invention relates to a system that uses a wireless microphone to transfer audio to an image pickup apparatus, a recording apparatus, or an audio mixer, and to a wireless microphone, an audio transmitting apparatus, an audio receiving apparatus, an image pickup apparatus, a recording apparatus, and an audio mixer that include such a system.

2. Description of the Related Art

In recent years, when news broadcasts and the like are filmed on location, it has become increasingly common to record audio transferred using wireless microphones. FIGS. 1A and 1B show the appearance of two examples of a wireless microphone. FIG. 1A shows wireless microphone transmitters (hereinafter simply “transmitters”) as apparatuses for transmitting audio. Each of the transmitters 81, 82 fundamentally includes a microphone (in the case of the transmitter 82, a pin microphone, not shown, that is connected by a cable) and a modulating/transmitting unit that transmits radio waves that have been modulated using an audio signal from the microphone. The transmitter 81 is a hand microphone-type transmitter that is held by hand. Conversely, the transmitter 82 is a transmitter that is attached to a waist belt or the like.

FIG. 1B shows a wireless microphone receiver (hereinafter simply “receiver”) as the apparatus for receiving the audio. The receiver 83 fundamentally includes a receiving/demodulating unit that receives radio waves transmitted from the transmitter 81 or transmitter 82 and demodulates the audio signal and an output terminal that outputs the demodulated audio signal to the outside.

FIGS. 2A and 2B are diagrams showing examples of an audio transfer system that uses the transmitter 81 and the receiver 83 shown in FIGS. 1A and 1B to record audio during ENG (Electronic News Gathering). In the example in FIG. 2A, the transmitter 81 is used by a reporter conducting an interview. The receiver 83 is attached to a slot provided on a camcorder 91 (i.e., a camcorder integrated with a recorder such as a VTR or optical disk apparatus) or is connected to the camcorder 91 by a cable. The audio signal inputted from the receiver 83 into the camcorder 91 is recorded by the camcorder 91 together with the images picked up by the camcorder 91.

In the example in FIG. 2B, the transmitter 81 is used by a reporter and the receiver 83 is connected by a cable to an audio mixer 92. The audio signal inputted from the receiver 83 into the audio mixer 92 is mixed or switched inside the audio mixer 92 and the audio signal outputted from the audio mixer 92 is recorded by a VTR or audio recorder or camcorder, not shown.

In the past, for a wireless microphone such as the examples shown in FIGS. 1A and 1B, a circuit that emits a tone signal of a predetermined frequency outside the audible spectrum is provided inside the transmitter, such tone signal is superimposed on an audio signal and transmitted from the transmitter, and a circuit that detects this tone signal is provided inside the receiver, so that information can be transmitted as described below, for example.

The receiver identifies the radio waves from the transmitter and distinguishes the waves from interference The receiver is informed of a drop in the voltage of a battery inside the transmitter and an indicator on the receiver is lit In the past, to reduce in size of this kind of wireless microphone, the transmitter and the receiver have been provided with only a minimal number of operation buttons for carrying out setting operations of the respective devices.

Moreover, for this type of wireless microphone, Japanese Unexamined Patent Application Publication No. 2007-36735 has disclosed a technology where the receiver detects unused frequencies in the radio waves based on the reception level of the radio waves and outputs information showing the detected unused frequencies to a camcorder or audio mixer (such information being displayed by the camcorder or audio mixer) so that the operator of the camcorder or audio mixer can check which frequencies are unused and set the frequency to be used by the wireless microphone.

SUMMARY OF THE INVENTION

In this way, although a tone signal is superimposed on an audio signal and transmitted by an existing wireless microphone, such tone signal is only used to distinguish the signal from interference and/or to give a warning of a drop in battery voltage.

Also, with an audio transfer system that uses an existing wireless microphone, such as those shown in FIGS. 2A and 2B, the camcorder or audio mixer is operated either by a specialist operator (such as a cameraman or soundman) other than the reporter or, when the reporter carries out filming alone without such an operator being present, by the reporter himself or herself walking up to the camcorder or audio mixer.

However, since the reporter has to walk up to the camcorder or audio mixer every time an operation is made, this results in poor operability and can prevent filming from proceeding smoothly. On the other hand, when a specialist operator makes such operations, there is an increase in the number of staff required by filming.

As one method of having a reporter who is filming alone make such operations without having to walk up to the camcorder or audio mixer, it would be conceivable to provide dedicated operation buttons for remote operation of the camcorder or audio mixer on the transmitter.

However, if such dedicated operation buttons are added to the transmitter, this would obstruct the ongoing progress in the miniaturization of wireless microphones.

On the other hand, if small buttons were provided as such dedicated operation buttons to keep the transmitter small, operability would still be poor.

When such dedicated operation buttons are provided to add a new function (i.e., to make remote operation possible), there is a resulting increase in the number of operation buttons, which makes the configuration of operation system more complex and can lead to erroneous operations.

Also, the disclosed technology in Japanese Unexamined Patent Application Publication No. 2007-36735 enables the operator of a camcorder or audio mixer to set the frequency used by a wireless microphone and is not a technology for making it easy for the user of a transmitter (such as a reporter) to operate a camcorder or audio mixer.

According to embodiments of the present invention, for an audio transfer system, such as those shown in FIGS. 2A and 2B where an audio signal is inputted from a wireless microphone into an image pickup apparatus, recording apparatus, or audio mixer, aims to improve the operability when a user who is using a transmitter operates the image pickup apparatus, recording apparatus, or audio mixer, while keeping the wireless microphone small.

A wireless audio transfer system according to an embodiment of the present invention includes an audio transmitting apparatus including a microphone and a modulating/transmitting unit for transmitting radio waves modulated using an audio signal from the microphone, an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit, and an image pickup apparatus including an audio input terminal for inputting the audio signal outputted from the audio receiving apparatus.

In this wireless audio transfer system of the embodiment, the audio transmitting apparatus includes a connection terminal for connecting a human interface device and a data transmitting unit for transmitting, as radio waves, data corresponding to an operation of the human interface device connected to the connection terminal, the audio receiving apparatus includes a first communication terminal and a data processing unit for obtaining the data from the received radio waves and outputting a control signal corresponding to the data from the first communication terminal, and the image pickup apparatus includes a second communication terminal for inputting the control signal outputted from the first communication terminal of the audio receiving apparatus and a control unit for controlling an inside of the image pickup apparatus in accordance with the control signal inputted into the second communication terminal.

Another wireless audio transfer system according to an embodiment of the present invention includes an audio transmitting apparatus including a microphone and a modulating/transmitting unit for transmitting radio waves modulated using an audio signal from the microphone, an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit, and a recording apparatus including an audio input terminal for inputting the audio signal outputted from the audio receiving apparatus.

In this wireless audio transfer system of the embodiment, the audio transmitting apparatus includes a connection terminal for connecting a human interface device and a data transmitting unit for transmitting, as radio waves, data corresponding to an operation of the human interface device connected to the connection terminal, the audio receiving apparatus includes a first communication terminal and a data processing unit for obtaining the data from the received radio waves and outputting a control signal corresponding to the data from the first communication terminal, and the recording apparatus includes a second communication terminal for inputting the control signal outputted from the first communication terminal of the audio receiving apparatus and a control unit for controlling an inside of the recording apparatus in accordance with the control signal inputted into the second communication terminal.

Yet another wireless audio transfer system according to an embodiment of the present invention includes an audio transmitting apparatus including a microphone and a modulating/transmitting unit for transmitting radio waves modulated using an audio signal from the microphone, an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit, and an audio mixer including an audio input terminal for inputting the audio signal outputted from the audio output terminal of the audio receiving apparatus. In this wireless audio transfer system of the embodiment, the audio transmitting apparatus includes a connection terminal for connecting a human interface device and a data transmitting unit for transmitting, as radio waves, data corresponding to an operation of the human interface device connected to the connection terminal, the audio receiving apparatus includes a first communication terminal and a data processing unit for obtaining the data from the received radio waves and outputting a control signal corresponding to the data from the first communication terminal, and the audio mixer includes a second communication terminal for inputting the control signal outputted from the first communication terminal of the audio receiving apparatus and a control unit for controlling an inside of the audio mixer in accordance with the control signal inputted into the second communication terminal.

An embodiment of the present invention further includes a wireless microphone, audio transmitting apparatus, audio receiving apparatus, image pickup apparatus, recording apparatus, and audio mixer that include any of the wireless audio transfer systems described above.

According to an embodiment of the present invention, an audio transmitting apparatus (or "transmitter") that includes a wireless microphone includes a connection terminal for connecting a human interface device. By connecting a human interface device to such connection terminal and operating the device, data corresponding to such operation is transmitted as radio waves by a data transmitting unit inside the audio transmitting apparatus.

In the audio receiving device (or "receiver"), the data processing unit obtains data from the radio waves received from the audio transmitting apparatus and a control signal corresponding to such data is outputted from the communication terminal.

In an image pickup apparatus, recording apparatus, or audio mixer into which an audio signal is inputted using this wireless microphone, the control signal from the audio receiving apparatus is inputted into a communication terminal. A control unit of the image pickup apparatus, recording apparatus, or audio mixer controls the inside of the image pickup apparatus, recording apparatus, or audio mixer in accordance with this control signal.

Consequently, the user who uses the audio transmitting apparatus can remotely operate the image pickup apparatus, recording apparatus, or audio mixer using the human interface device connected to the audio transmitting apparatus.

On the human interface device connected to the audio transmitting apparatus, the number of operation buttons can optionally be increased or decreased in accordance with how the system is used. When complex operations are carried out, a device with a large number of operation buttons may be used, such as a keyboard. Conversely, when simple operations are carried out, a device with around one or two operation buttons may be used, such as a mouse.

Since it is possible to select a device of a size and form that is easy for the user to operate as the human interface device, it is possible for the user to make operations using his or her preferred control device.

In addition, since operation buttons for remote operation are not provided on the audio transmitting apparatus itself, the size of the wireless microphone can be kept small as those in the related art.

Consequently, in an audio transfer system where an audio signal is inputted from a wireless microphone into an image pickup apparatus, recording apparatus, or audio mixer, it is possible to keep the wireless microphone small while improving operability when the user using the audio transmitting apparatus (or "transmitter") operates a camcorder, recording apparatus, or audio mixer.

BRIEF DESCRIPTION OF THE DRAWINGS

FIGS. 12A and 12B are diagrams showing examples of table data stored by microcomputers inside the transmitter and the receiver in the example shown in FIG.10;

DESCRIPTION OF THE PREFERRED EMBODIMENTS

Preferred embodiments of the present invention will now be described in detail with reference to the attached drawings. Note that two systems, which are an audio transfer system for inputting an audio signal from a wireless microphone into a camcorder and an audio transfer system for inputting an audio signal from a wireless microphone into an audio mixer, will be described.

[System for Inputting Audio Signals Into a Video Camera]

Figure 3:
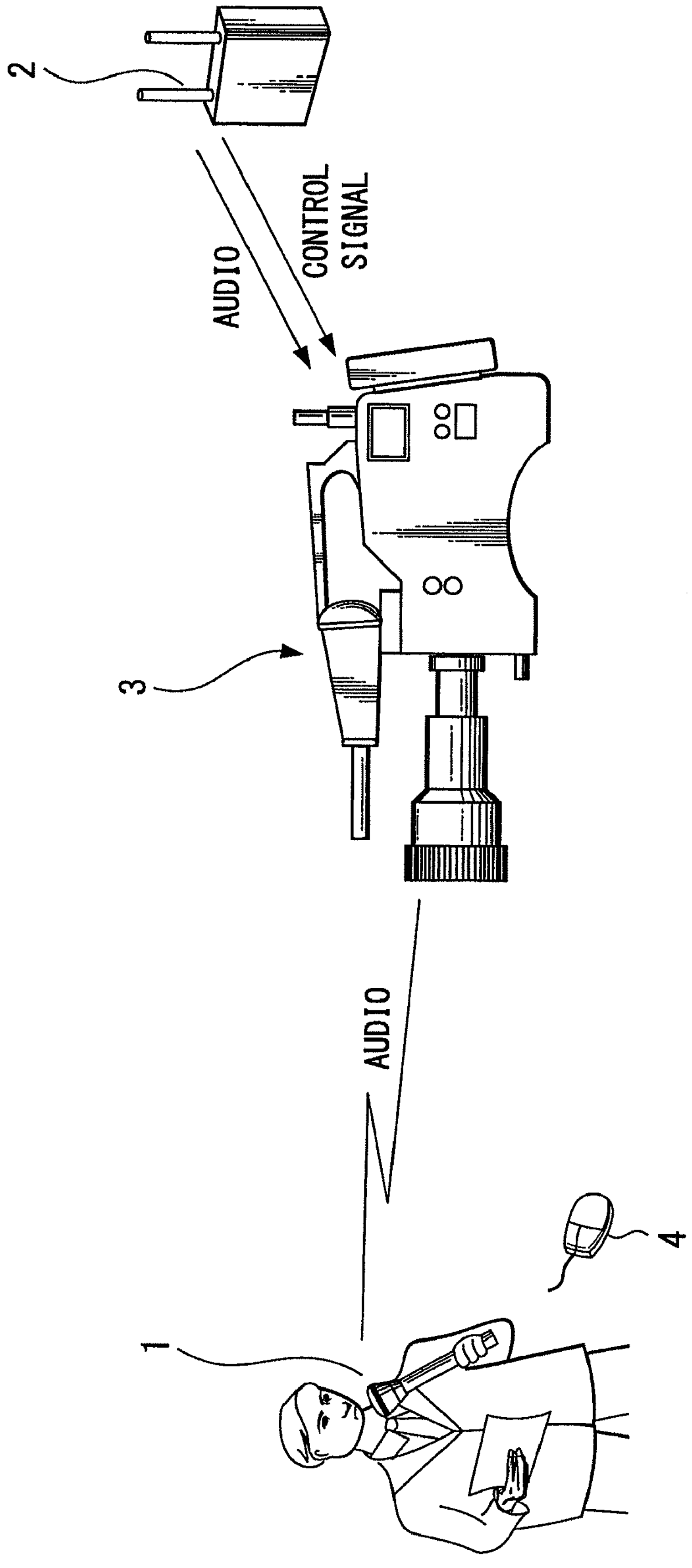
FIG. 3 is a view showing an example of an audio transfer system to which an embodiment of the present invention has been applied.

System FIG. 3 is a diagram showing one example of an audio transfer system to which an embodiment of the present invention has been applied. This system inputs audio transferred using a wireless microphone into a camcorder (i.e., a video camera integrated with a recorder such as a VTR or optical disk apparatus) in order to record audio during ENG (Electronic News Gathering). FIG. 3 is a diagram showing one example of an audio transfer system to which an embodiment of the present invention has been applied. This system inputs audio transferred using a wireless microphone into a camcorder (i.e., a camcorder integrated with a recorder such as a VTR or optical disk apparatus) in order to record audio during ENG (Electronic News Gathering).

Figure 1A:
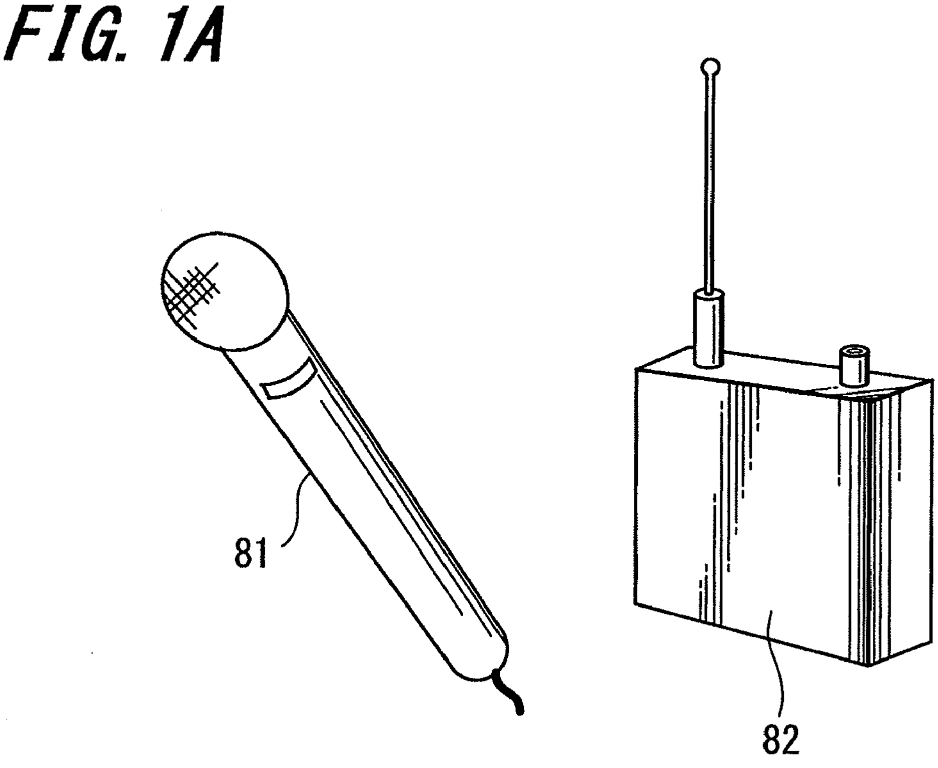
FIGS. 1A and 1B are views showing the appearance of wireless microphones.
Figure 1B:
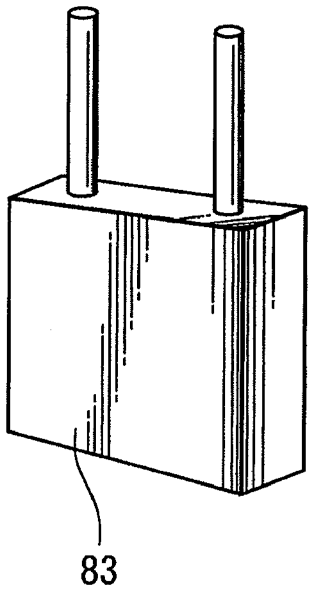
Figure 2A:
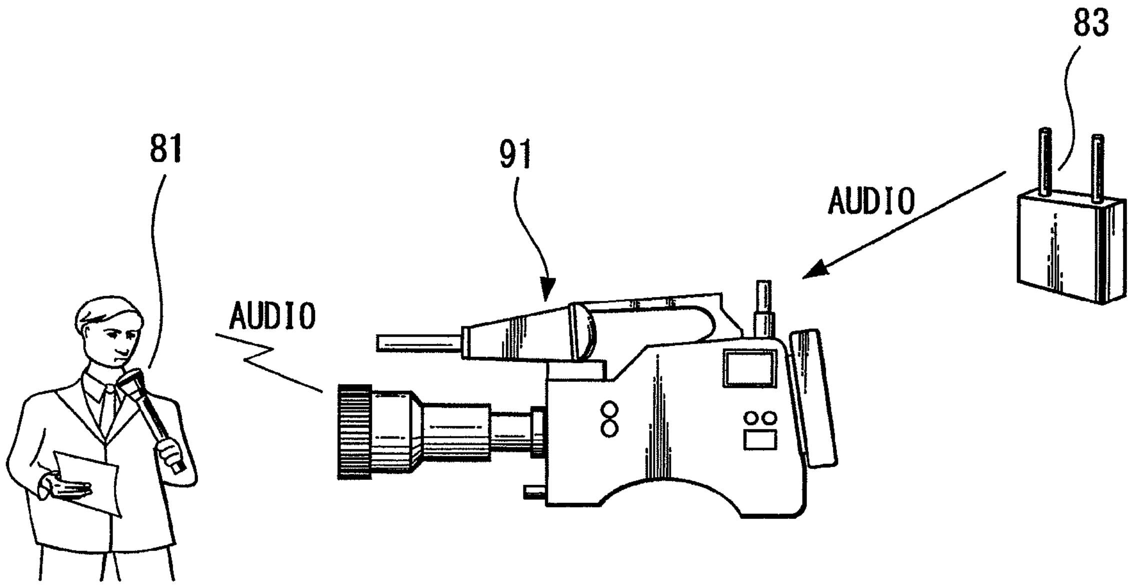
FIGS. 2A and 2B are views showing examples of audio transfer systems that use a wireless microphone.
Figure 2B:
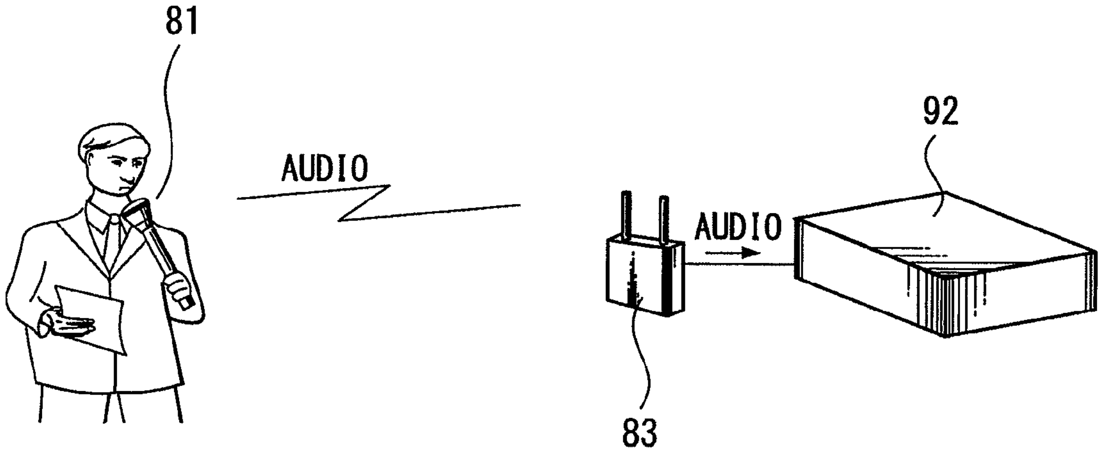

A wireless microphone transmitter (hereinafter simply "transmitter") is used by a reporter conducting an interview. Although a hand microphone-type transmitter is shown as the transmitter 1 in FIG. 3, the transmitter 1 may be a device that is attached to a waist belt or the like (a device of the same form as the transmitter 82 shown in FIG. 1A).

The wireless microphone receiver (hereinafter, simply called "receiver") 2 is attached to a slot provided on the camcorder 3 (or is attached to the camcorder 3 by a cable). The audio signal transferred to the receiver 2 from the transmitter 1 is inputted into the camcorder 3 from the receiver 2 and is recorded by the camcorder 3 together with the images picked up by the camcorder 3.

In the present system, when the reporter is filming alone by himself/herself by himself/herself while reporting, the reporter clicks a USB (Universal Serial Bus)-compliant mouse 4 that the reporter has at hand to remotely operate the camcorder 3. Next, the configuration of the transmitter 1 and the receiver 2 that make it possible to operate the camcorder 3 according to this method will be described.

Figure 4:
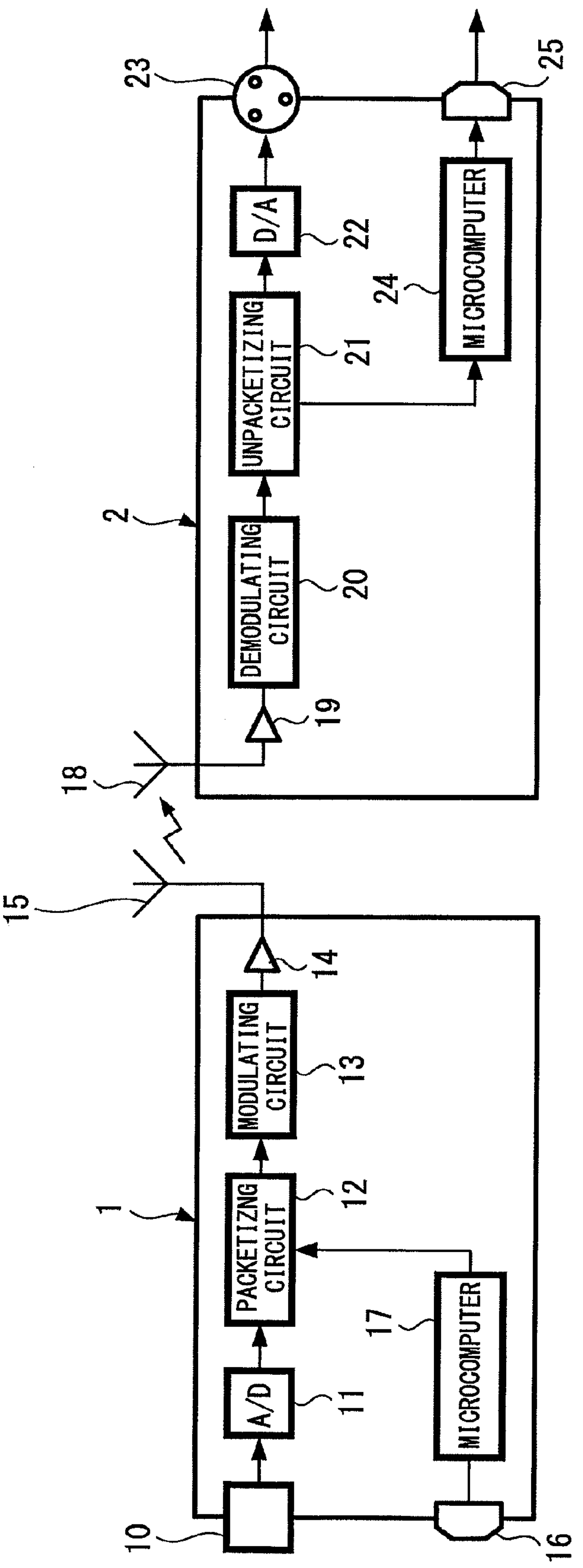
FIG. 4 is a block diagram showing an example configuration of a transmitter and a receiver shown in FIG. 3.

FIG. 4 is a block diagram that shows example configurations of the transmitter 1 and the receiver 2. In the examples, the transmitter 1 and the receiver 2 includes a digital wireless microphone.

The transmitter 1 includes a microphone 10, an A/D converter 11 that carries out analog/digital conversion on an audio signal from the microphone 10, a packetizing circuit 12 that converts the digital audio signal from the A/D converter 11 to packets, a modulating circuit 13 that transmits radio waves modulated using the packet signal outputted from the packetizing circuit 12, an amp 14, and a transmission antenna 15. When the transmitter 1 is attached to a waist belt or the like, the microphone 10 is a pin microphone connected by a cable.

In addition, the transmitter 1 includes an USB terminal 16 and a microcomputer 17.

The microcomputer 17 stores a program that provides the transmitter 1 with a USB host function.

The microcomputer 17 also stores a program that generates a packet signal appended with control data corresponding to an operation of a USB-compliant human interface device (such as a mouse or keyboard) connected to the USB terminal 16 as a program for controlling the packetizing circuit 12.

Figures 5, 6:
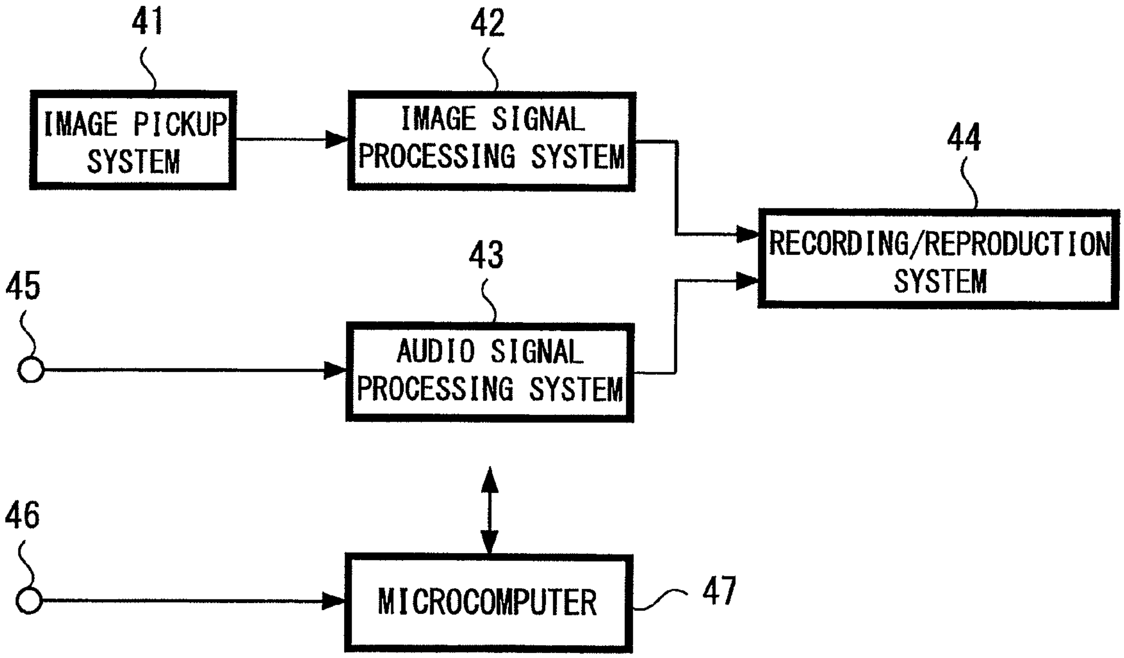
FIG. 5 is a diagram showing an example of table data stored by a microcomputer inside the transmitter in the system shown in FIG. 3.
FIG. 6 is a block diagram showing the overall configuration of a camcorder shown in FIG. 3.

Table data such as that shown in FIG. 5 for associating a left click with control data showing "start recording" and associating a right click with control data showing "stop recording" is provided in the control program for the packetizing circuit 12 as table data showing the correspondence between operations of the mouse and control data.

The receiver 2 includes a reception antenna 18, an amp 19, a demodulating circuit 20 that receive radio waves transmitted from the transmitter 1 and demodulate the packet signal, an unpacketizing circuit 21 that extracts the digital audio signal and the control data from the packet signal demodulated by the demodulating circuit 20, a D/A converter 22 that carries out digital/analog conversion on the digital audio signal extracted by the unpacketizing circuit 21, and an audio output terminal 23 that outputs an analog audio signal from the D/A converter 22.

The receiver 2 is also equipped with a microcomputer 24 and a communication terminal 25 for serial communication.

The control data extracted by the unpacketizing circuit 21 is sent to the microcomputer 24. The microcomputer 24 outputs a control signal, which indicates an operation shown by the control data, from the communication terminal 25.

FIG. 6 is a block diagram showing the overall configuration of the camcorder 3 shown in FIG. 3. Since the parts of the camcorder 3 labeled as "image pickup system 41", "image signal processing system 42", "audio signal processing system 43", and "recording/reproduction system 44" have the same hardware configurations as in a standard camcorder, such parts have been simplified in the drawing.

The camcorder 3 is also equipped with an audio input terminal 45 for inputting an analog audio signal outputted from the audio output terminal 23 (shown in FIG. 4) of the receiver 2 and a communication terminal 46 for inputting a control signal outputted from the communication terminal 25 (shown in FIG. 4) of the receiver 2.

The analog audio signal inputted into the audio input terminal 45 is sent to the audio signal processing system 43. The control signal inputted into the communication terminal 46 is sent to a microcomputer 47 for carrying out internal control of the camcorder 3.

When the control signal indicates "start recording", in the same way as when a start recording operation has been carried out using an operation panel (not shown) of the camcorder 3, the microcomputer 47 controls the image signal processing system 42, the audio processing system 43, and the recording/reproduction system 44 to start the recording of images and audio.

On the other hand, when the control signal indicates "stop recording", in the same way as when a stop recording operation has been carried out using the operation panel, the microcomputer 47 controls the image signal processing system 42, the audio processing system 43, and the recording/reproduction system 44 to stop the recording of images and audio.

In the system shown in FIG. 3, when the reporter who uses the transmitter 1 left-clicks the mouse 4 in a state where the mouse 4 is connected to the USB terminal 16 (see FIG. 4) of the transmitter 1, control data showing the start of recording is transmitted from the transmitter 1 as radio waves. Conversely, when the reporter right-clicks the mouse 4, control data showing a stopping of recording is transmitted from the transmitter 1 as radio waves.

In the receiver 2, the control data is obtained from the radio waves received from the transmitter 1 and a control signal, which indicates an operation shown by the control data, is outputted from the communication terminal 25.

In the camcorder 3, based on the control signal inputted into the communication terminal 46 from the receiver 2, the microcomputer 47 controls the starting and stopping of recording.

Consequently, the reporter using the transmitter 1 can remotely control the camcorder 3 using the mouse 4 connected to the transmitter 1.

[System for Inputting Audio Signals Into an Audio Mixer]

Figures 7, 8:
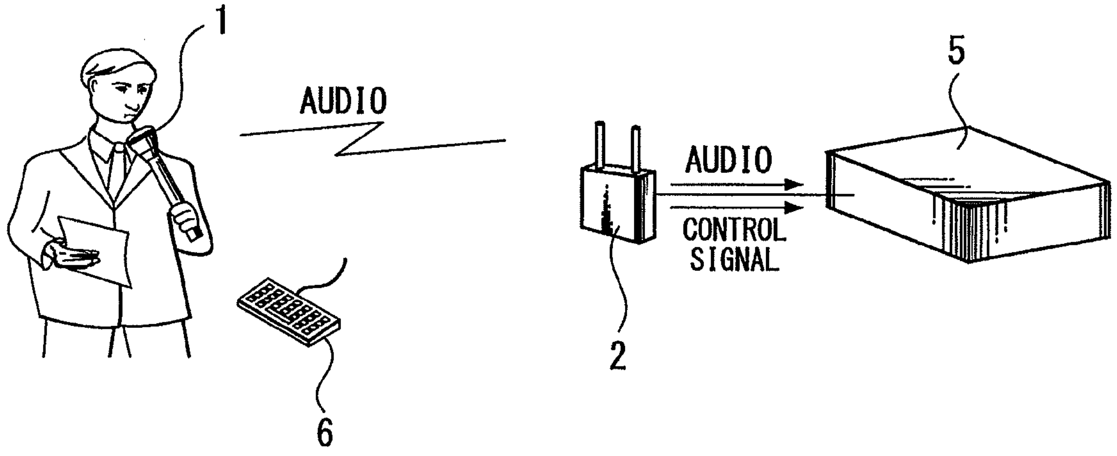
FIG. 7 is a view showing another example of an audio transfer system to which an embodiment of the present invention has been applied.
FIG. 8 is a diagram showing an example of table data stored by a microcomputer inside a transmitter in the system shown in FIG. 7.

FIG. 7 is a diagram showing another example of an audio transfer system to which an embodiment of the present invention has been applied. In this system, to record audio during ENG (Electronic News Gathering), audio transferred using a wireless microphone is inputted into an audio mixer.

In this system, since the transmitter 1 and the receiver 2 have the same hardware configurations (see FIG. 4) as in the system shown in FIG. 3, the same reference numerals have been assigned as in FIG. 3.

Here also, the microcomputer 17 in the transmitter 1 (see FIG. 4) stores a program that provides the transmitter 1 with a USB host function and also stores a program that generates a packet signal appended with control data corresponding to an operation of a USB-compliant human interface device connected to the USB terminal 16 (see FIG. 4) as a program for controlling the packetizing circuit 12.

In the system shown in FIG. 7, the transmitter 1 is used by a reporter conducting an interview. The receiver 2 is connected by a cable to the audio mixer 5. The audio signal inputted into the audio mixer 5 from the receiver 2 is mixed or switched inside the audio mixer 5 and an audio signal outputted from the audio mixer 5 is recorded in a VTR (or an audio recorder or camcorder), not shown.

In this system, when the reporter is filming alone by himself/herself while reporting, the reporter remotely controls the audio mixer 5 by operating a USB-compliant keyboard 6 that the reporter has at hand.

Consequently, the program for controlling the packetizing circuit 12 stored in the microcomputer 17 inside the transmitter 1 is provided, as table data showing the correspondence between operations of the keyboard and control data, with table data such as that shown in FIG. 8. According to the table, an operation of an up cursor key labeled "↑" is associated with control data showing a raising of output volume, an operation of a down cursor key labeled "↓" is associated with control data showing a lowering of output volume, an operation of a right cursor key labeled "→" is associated with control data showing a raising of input volume, an operation of a left cursor key labeled "←" is associated with control data showing a lowering of input volume, an operation of the "1" key on a ten-key pad is associated with control data showing mixing of an audio signal, and an operation of the "2" key on a ten-key pad is associated with control data showing no mixing of an audio signal.

Figure 9:
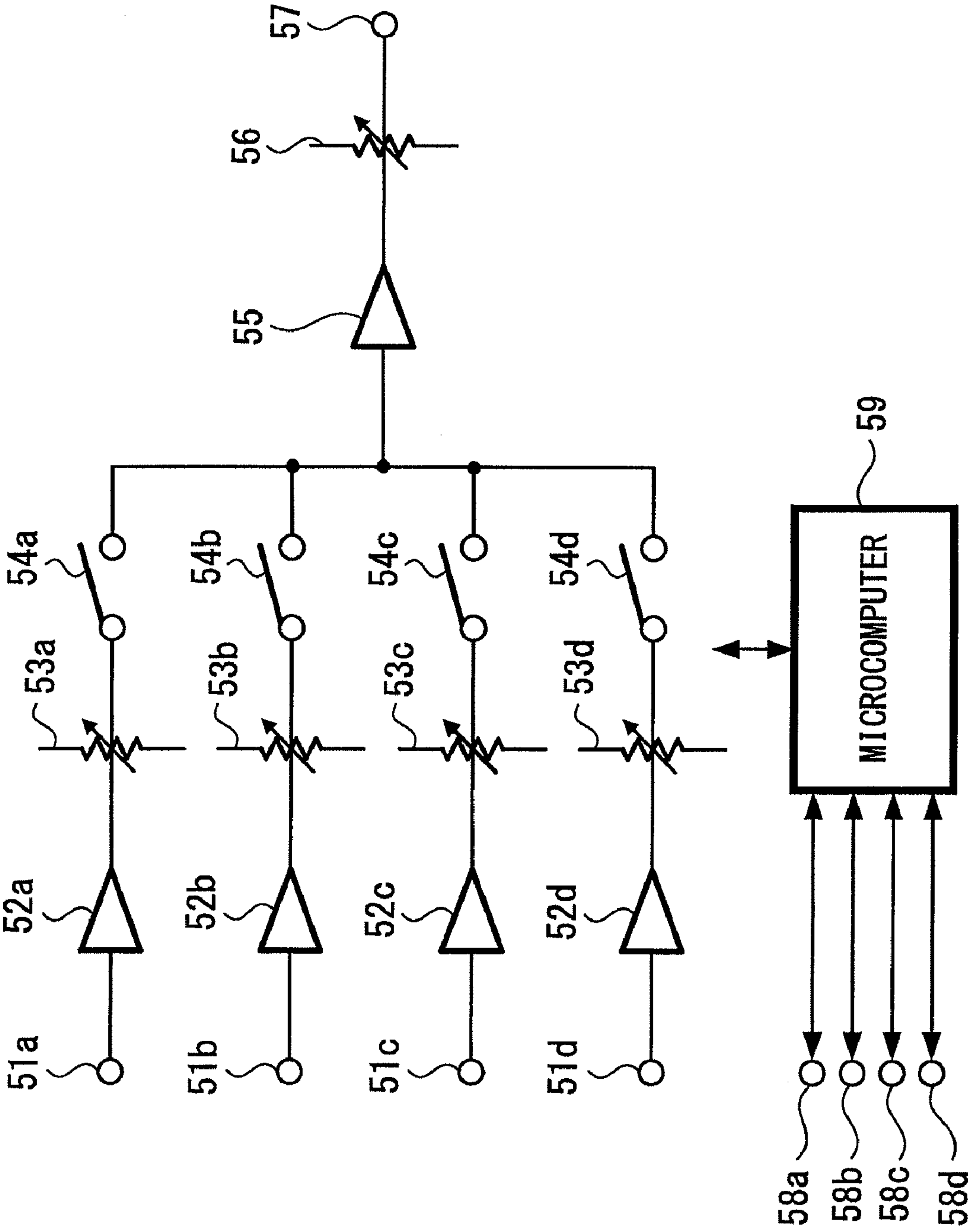
FIG. 9 is a block diagram showing the overall configuration of an audio mixer shown in FIG. 7.

FIG. 9 is a block diagram showing the overall configuration of the audio mixer 5 shown in FIG. 7. The audio mixer 5 is an audio mixer that can mix audio signals on four channels and includes four audio input terminals 51*a* to 51*d*.

Audio signals inputted into the audio input terminals 51*a* to 51*d* are supplied to a mixing amp 55 via amps 52*a* to 52*d*, variable volume controls (faders) 53*a* to 53*d*, and switches 54*a* to 54*d* that can be switched on or off. The output audio signal from the mixing amp 55 is outputted via a variable volume control 56 from an audio output terminal 57.

On the audio mixer 5, serial communication terminals 58*a* to 58*d* of the same specification as the communication terminal 25 (see FIG. 4) of the receiver 2 are provided so as to correspond one-to-one with the four audio input terminals 51*a* to 51*d*.

The audio output terminal 23 and communication terminal 25 (see FIG. 4) of the receiver 2 are connected to a corresponding audio input terminal and communication terminal out of the audio input terminals 51*a* to 51*d* and communication terminals 58*a* to 58*d* by cables (for example, when the audio output terminal 23 is connected to the audio input terminal 51*a*, the communication terminal 25 is connected to the communication terminal 58*a*).

The control signal inputted into the communication terminals 58*a* to 58*d* is sent to the microcomputer 59 that carries out internal control of the audio mixer 5.

When the control signal indicates a raising of the output volume, in the same way as when an operation that raises the output volume has been made via the operation panel (not shown) of the audio mixer 5, the microcomputer 59 controls the variable volume control 56 to raise the output volume.

When the control signal indicates a lowering of the output volume, in the same way as when an operation that lowers the output volume has been made via the operation panel, the microcomputer 59 controls the variable volume control 56 to lower the output volume.

When the control signal indicates a raising of the input volume, in the same way as when an operation that raises the input volume has been made via the operation panel, the microcomputer 59 controls the variable volume control, out of the variable volume controls 53*a* to 53*d*, supplied with the audio signal inputted into the audio input terminal corresponding to the communication terminal in which the control signal was inputted (for example, the variable volume control 53*a* when a control signal has been inputted into the communication terminal 58*a*) to raise the input volume.

When the control signal indicates a lowering of the input volume, in the same way as when an operation that lowers the input volume has been made via the operation panel, the microcomputer 59 controls the variable volume control, out of the variable volume controls 53*a* to 53*d*, supplied with the audio signal inputted into the audio input terminal corresponding to the communication terminal in which the control signal was inputted to lower the input volume.

When the control signal indicates mixing of an audio signal, in the same way as when an operation that indicates mixing of an audio signal from the transmitter 1 has been made via the operation panel, the microcomputer 59 switches on the switch, out of the switches 54*a* to 54*d*, supplied with the audio signal inputted into the audio input terminal corresponding to the communication terminal in which the control signal was inputted (for example, the switch 54*a* when a control signal was inputted into the communication terminal 58*a*).

When the control signal indicates no mixing of an audio signal, in the same way as when an operation that indicates no mixing of an audio signal from the transmitter 1 has been made via the operation panel, the microcomputer 59 switches off the switch, out of the switches 54*a* to 54*d*, supplied with an audio signal inputted into the audio input terminal corresponding to the communication terminal in which the control signal was inputted.

In the system shown in FIG. 7, when the reporter using the transmitter 1 presses the up cursor key labeled "↑" on the keyboard 6 in a state where the keyboard 6 is connected to the USB terminal 16 of the transmitter 1 (see FIG. 4), control data showing a raising of the output volume is transmitted from the transmitter 1 as radio waves. Conversely when the reporter presses the down cursor key labeled "↓" on the keyboard 6, control data showing a lowering of the output volume is transmitted from the transmitter 1 as radio waves.

Similarly, when the reporter presses the right cursor key labeled "→" on the keyboard 6, control data showing a raising of the input volume is transmitted from the transmitter 1 as radio waves. Also, when the reporter presses the left cursor key labeled "←" on the keyboard 6, control data showing a lowering of the input volume is transmitted from the transmitter 1 as radio waves.

Also, when the reporter presses the "1" key on a ten-key pad on the keyboard 6, control data showing mixing is transmitted from the transmitter 1 as radio waves. When the reporter presses the "2" key on a ten-key pad on the keyboard 6, control data showing no mixing is transmitted from the transmitter 1 as radio waves.

In the receiver 2, the control data is obtained from the radio waves received from the transmitter 1 and a control signal, which indicates an operation shown by the control data, is outputted from the communication terminal 25.

In the audio mixer 5, based on the control signal inputted from the receiver 2, the microcomputer 59 controls the output volume, the input volume of the audio signal from the receiver 2, or whether the audio signal from the receiver 2 is to be mixed.

Consequently, the reporter using the transmitter 1 can remotely operate the audio mixer 5 using the keyboard 6 connected to the transmitter 1.

As described above, in an audio transfer system to which an embodiment of the present invention has been applied, the reporter that uses the transmitter 1 can remotely operate a camcorder or audio mixer using a common human interface device (for example, a mouse or keyboard) connected to the transmitter 1.

Here, on the human interface device connected to the transmitter 1, the number of operation buttons can optionally be increased or decreased in accordance with how the system is used. When complex operations are carried out, a device with a large number of operation buttons may be used, such as the keyboard 6 in the system shown in FIG. 7. Conversely, when simple operations are carried out, a device with around one or two operation buttons may be used, such as the mouse 4 in the system shown in FIG. 7.

Since it is possible to select a device of a size and form that is easy for the user to operate out of commercially available devices as the mouse or keyboard connected to the transmitter 1, it is possible for the user to make operations using his or her preferred control device.

In addition, since operation buttons for remote operation are not provided on the transmitter 1 itself, the size of the wireless microphone can be kept small as in the past.

Consequently, in an audio transfer system where an audio signal is inputted from a wireless microphone into a camcorder or audio mixer, it is possible to keep the wireless microphone small while improving operability when the user using the transmitter 1 operates the camcorder or audio mixer.

Next, examples of alternative configurations of the transmitter 1 and the receiver 2 described above (i.e., alternatives to the configurations shown in FIG. 4) will be described with reference to FIGS. 10 to 13.

Figure 10:
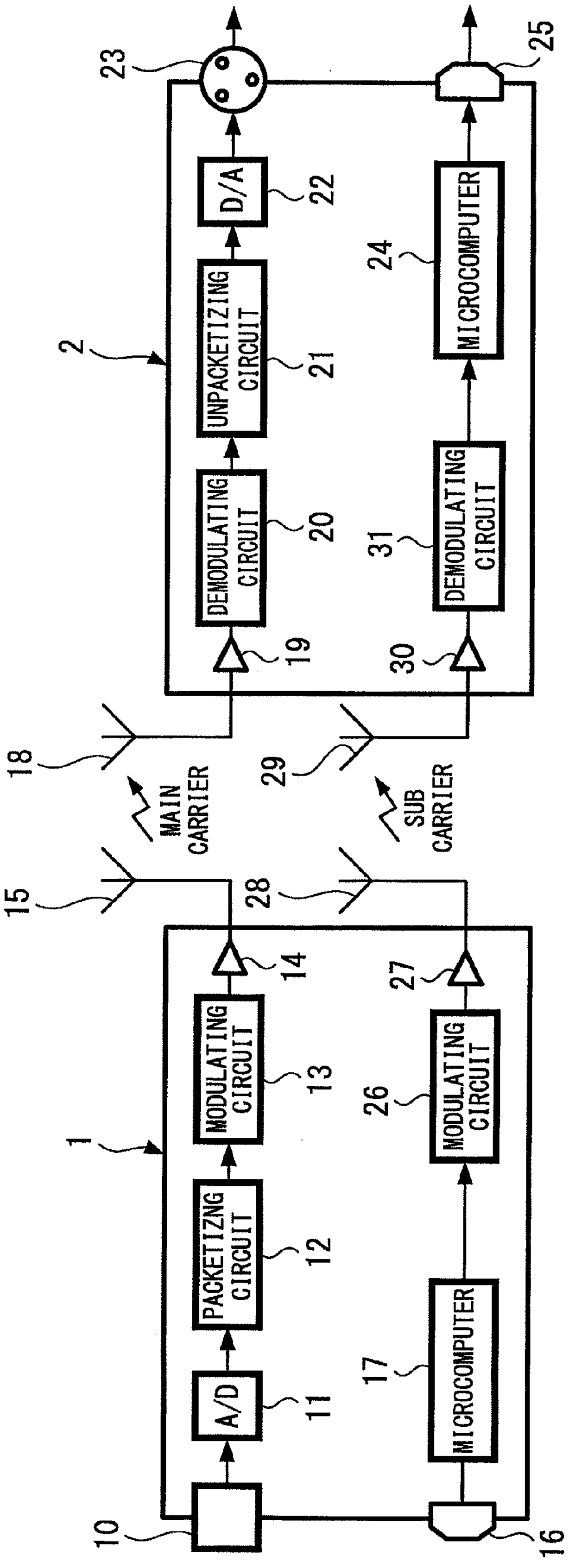
FIG. 10 is a block diagram showing another example configuration of the transmitter and the receiver shown in FIG. 3.

FIG. 10 is a block diagram showing other example configurations of the transmitter 1 and the receiver 2. Parts that are the same as in FIG. 4 are assigned the same reference numerals. In this example also, the transmitter 1 and the receiver 2 include a digital wireless microphone.

The transmitter 1 is also provided with a modulating circuit 26, an amp 27, and a transmission antenna 28 for transmitting a subcarrier of a different frequency band to a main carrier, the main carrier being the radio waves transmitted by the modulating circuit 13, the amp 14, and the transmission antenna 15.

In this example also, a program that provides the transmitter 1 with a USB host function is stored in the microcomputer 17. In this example, the microcomputer 17 supplies control data (control data such as that shown in FIG. 5 or 8) corresponding to an operation of a USB-compliant human interface device connected to the USB terminal 16 to the modulating circuit 26 so that the control data is transmitted as the subcarrier from the transmission antenna 28.

In addition to the reception antenna 18, the amp 19, and the demodulating circuit 20, the receiver 2 includes a reception antenna 29, an amp 30, and a demodulating circuit 31 to receive the subcarrier transmitted from the transmitter 1 and demodulate the control signal.

The control data demodulated by the demodulating circuit 31 is sent to the microcomputer 24. The microcomputer 24 outputs a control signal, which indicates an operation shown by the control data, from the communication terminal 25.

Figure 11:
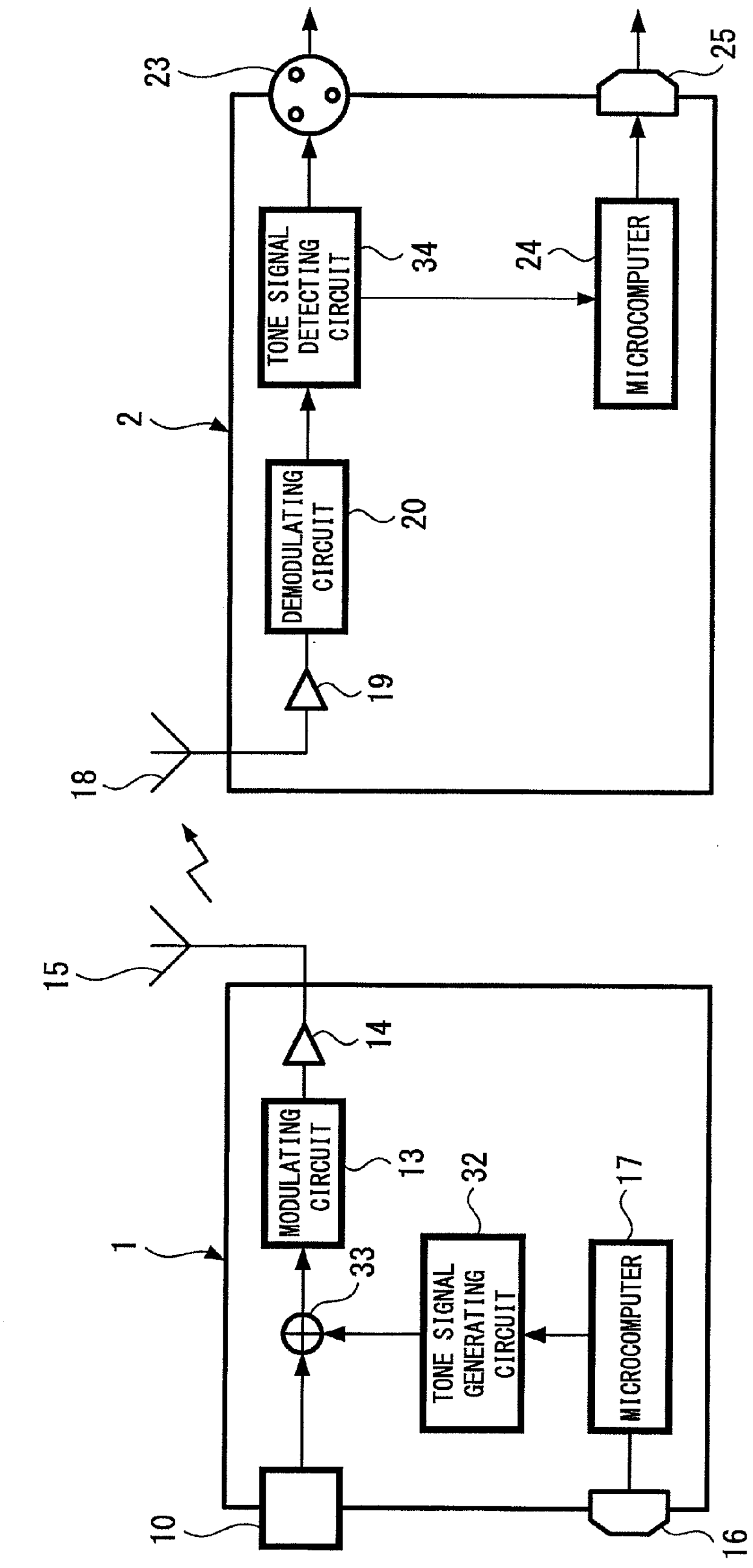
FIG. 11 is a block diagram showing yet another example configuration of the transmitter and the receiver shown in FIG. 3.

FIG. 11 is a block diagram showing other example configurations of the transmitter 1 and the receiver 2. Parts that are the same as in FIG. 4 are assigned the same reference numerals. In this example, the transmitter 1 and the receiver 2 transfer an analog audio signal.

The transmitter 1 includes a tone signal generating circuit 32, which generates a tone signal of a frequency outside the audible spectrum, and an adding circuit 33.

Here also, a program that provides the transmitter 1 with a USB host function is stored in the microcomputer 17.

A program for causing the tone signal generating circuit 32 to generate a tone signal of a frequency corresponding to an operation of a USB-compliant human interface device connected to the USB terminal 16 is also stored in the microcomputer 17 as a program for controlling the tone signal generating circuit 32.

Table data, such as that shown in FIG. 12A for example, that associates a left click with a tone signal of a specified frequency F1 outside the audible spectrum and associates a right click with a tone signal of a specified frequency F2 (≠F1) outside the audible spectrum is provided in the program for controlling the tone signal generating circuit 32 as table data showing the correspondence between operations of the mouse and tone signals.

The tone signal generated by the tone signal generating circuit 32 is superimposed on the audio signal from the microphone 10 by the adding circuit 33 and is sent to the modulating circuit 13.

The receiver 2 includes a tone signal detecting circuit 34 that detects the tone signal from the audio signal demodulated by the demodulating circuit 20. The tone signal detected by the tone signal detecting circuit 34 is sent to the microcomputer 24.

Table data, such as that shown in FIG. 12B for example, that associates a tone signal of the frequency F1 with control data indicating a start of recording and associates a tone signal of the frequency F2 with control data indicating a stopping of recording is provided in the microcomputer 24.

The microcomputer 24 outputs a control signal, which indicates an operation shown by the control data read from the table data corresponding to a frequency of the tone signal from the tone signal detecting circuit 34, from the communication terminal 25.

Note that table data for remotely operating the camcorder 3 shown in FIG. 3 are shown in FIGS. 12A and 12B in the same way, and table data that link respective operations and control data using tone signals of predetermined frequencies are also provided as table data for remotely operating the audio mixer 5 shown in FIG. 7.

Figure 13:
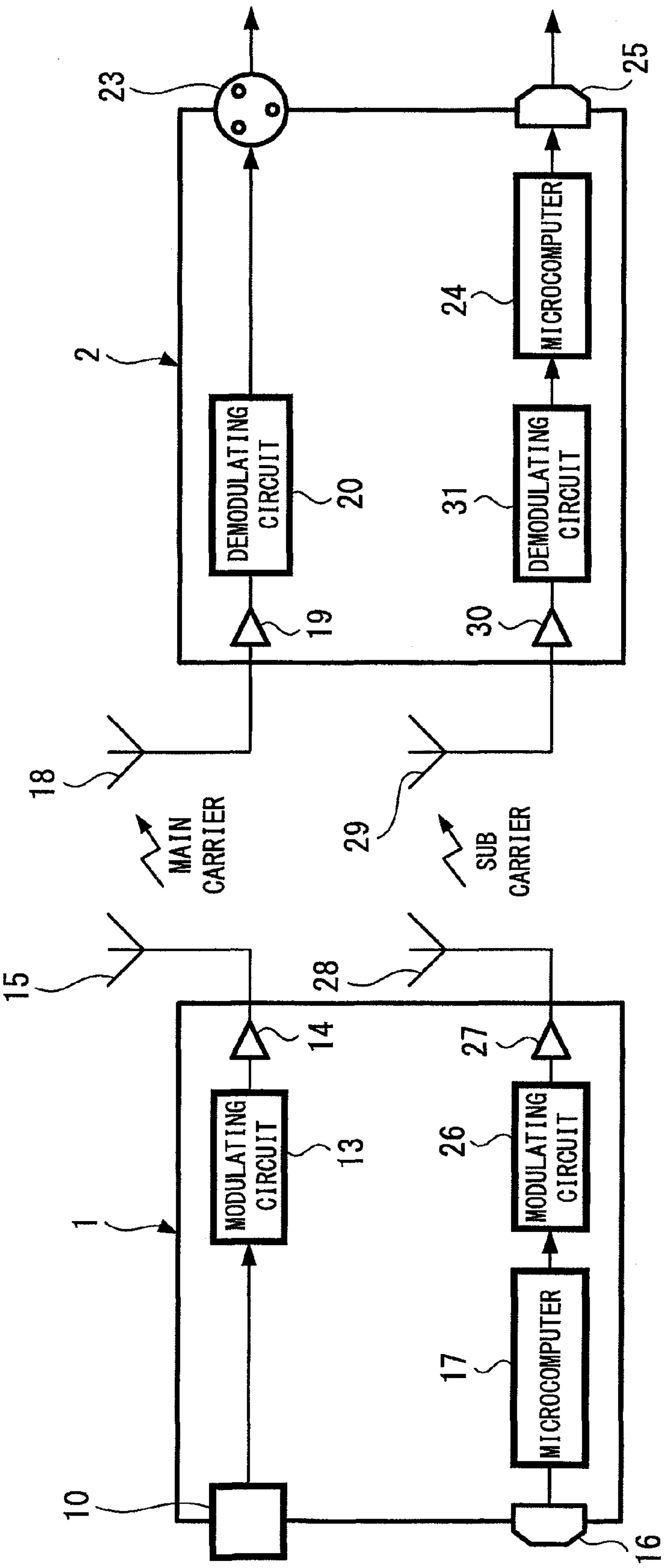
FIG. 13 is a block diagram showing yet another example configuration of the transmitter and the receiver shown in FIG. 3.

FIG. 13 is a block diagram showing other example configurations of the transmitter 1 and the receiver 2. Parts that are the same as in FIG. 4 and FIG. 10 are assigned the same reference numerals. In this example also, the transmitter 1 and the receiver 2 transfer an analog audio signal.

In this example also, a program that provides the transmitter 1 with a USB host function is stored in the microcomputer 17. In this example, the microcomputer 17 supplies control data (control data such as that shown in FIG. 5 and FIG. 8) corresponding to an operation of a USB-compliant human interface device connected to the USB terminal 16 to the modulating circuit 26 so that the control data is transmitted from the transmission antenna 28 as a subcarrier.

In the receiver 2, the control data demodulated by the demodulating circuit 31 is sent to the microcomputer 24. The microcomputer 24 outputs a control signal indicating the operation shown by the control data from the communication terminal 25.

Even if the configurations described with reference to FIG. 10 to FIG. 13 are used for the transmitter 1 and the receiver 2, it will still be possible to remotely operate the camcorder 3 shown in FIG. 3 or the audio mixer 5 shown in FIG. 5 using a USB-compliant mouse or keyboard connected to the transmitter 1.

Note that the correspondence between operations of the mouse or keyboard and the control data shown in FIG. 5 or FIG. 8 in the description above are merely examples, and by changing the table data provided in the microcomputer 17 inside the transmitter 1, it is possible to associate suitable operations of a suitable human interface device with suitable control data for a camcorder or audio mixer. For example, for an audio mixer with a function that applies effects (special effects) to an audio signal, it is possible to associate suitable operations of a keyboard with control data for turning such effect function on and off.

Also, in the description given above, a system that inputs an audio signal into a camcorder is shown in FIG. 3. However, the embodiment of the present invention may also be applied to remote operation (such as remote operation that starts or stops image pickup) of an image pickup apparatus in a system where an audio signal is inputted into an image pickup apparatus that does not have a function for recording images and audio. The embodiment of the present invention may also be applied to remote operation (such as remote operation that starts or stops recording) of a recording apparatus in a system where an audio signal is inputted into a recording apparatus (such as a VTR) that does not have an image pickup function but records images and audio or a dedicated audio recording apparatus.

As described earlier, FIG. 7 shows a system where a receiver and an audio mixer are connected by a cable. However, the embodiment of the present invention may be applied to a system where an audio signal is transferred from a transmitter into an audio mixer that has a receiver installed therein.

Figure 14:
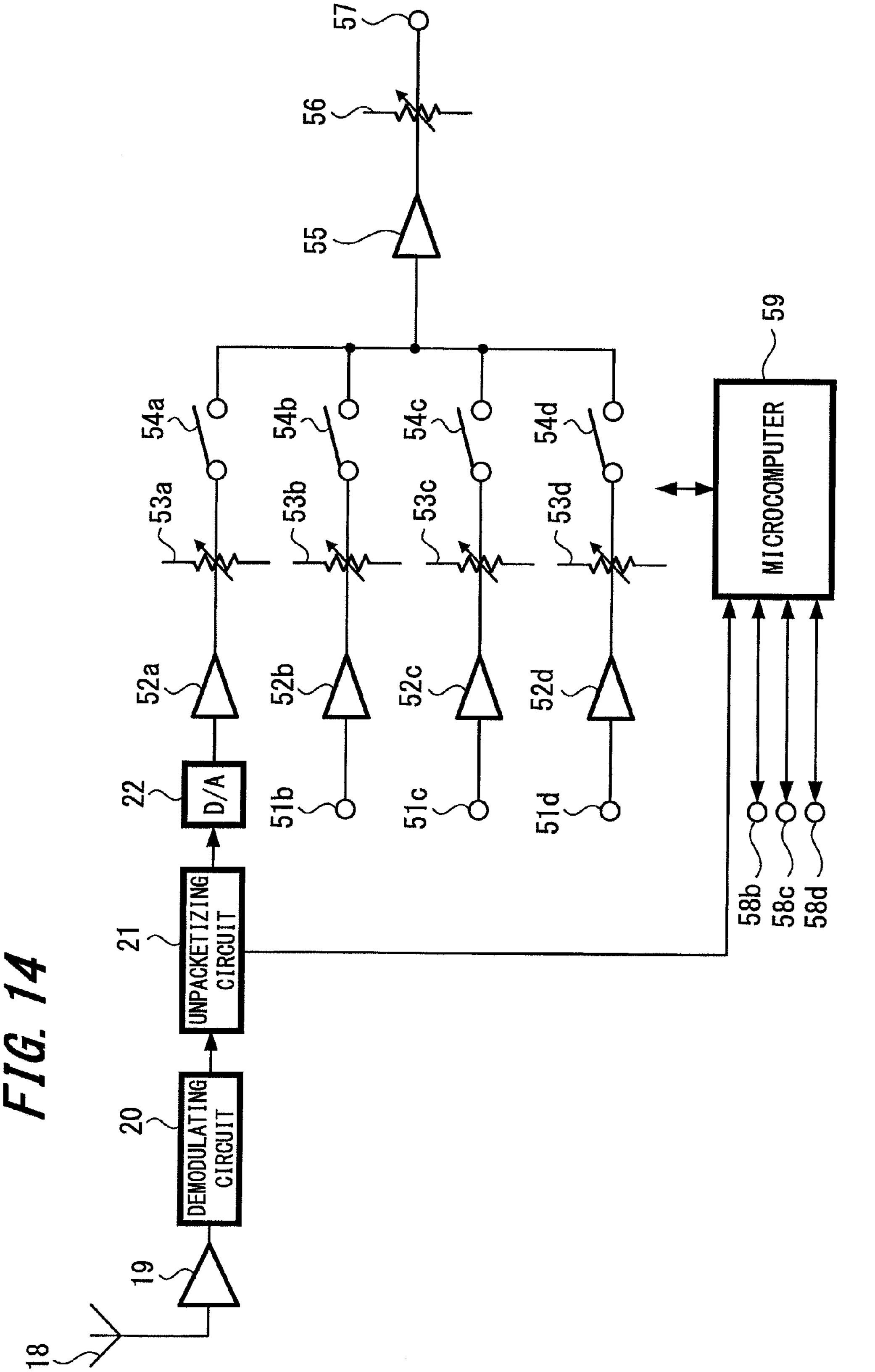
FIG. 14 is a block diagram showing an example configuration of an audio mixer in which a receiver is installed.

FIG. 14 is a block diagram showing an example where the receiver 2 of the configuration shown in FIG. 4 is installed in the audio mixer 5 of the configuration shown in FIG. 9. Parts that are the same as in FIG. 4 and FIG. 9 are assigned the same reference numerals. In this example, in place of the audio input terminal 51*a*, an audio signal from the D/A converter 22 is supplied to an amp 52*a*. In place of the communication terminal 58*a*, control data extracted by the unpacketizing circuit 21 is sent directly to the microcomputer 59, with the microcomputer 59 controlling the variable volume control 56, the variable volume control 53*a*, or the switch 54*a* in accordance with the control data.

In the description above, the USB terminal 16 is provided in the transmitter 1. However, a terminal other than a USB terminal that can connect a human interface device may be provided in the transmitter 1 and data corresponding to an operation of the human interface device connected to such terminal may be transmitted as radio waves from the transmitter 1.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless audio transfer system comprising;

an audio transmitting apparatus including a microphone and modulating/transmitting unit for transmitting radio waves modulated using an audio signal from the microphone;

an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit; and an image pickup apparatus including an audio input terminal for inputting the audio signal outputted from the audio receiving apparatus, wherein the audio transmitting apparatus includes a connection terminal for connecting a human interface device and a data transmitting unit for transmitting, as radio waves, data corresponding to an operation of the human interface device connected to the connection terminal, the audio receiving apparatus includes a first communication terminal and a data processing unit for obtaining the data from the received radio waves and outputting a control signal corresponding to the data from the first communication terminal, and the image pickup apparatus includes a second communication terminal for inputting the control signal outputted from the first communication terminal of the audio receiving apparatus and a control unit for controlling an inside of the image pickup apparatus in accordance with the control signal inputted into the second communication terminal.

2. A wireless audio transfer system comprising:

an audio transmitting apparatus including a microphone and a modulating/transmitting unit for transmitting radio waves modulated using an audio signal from the microphone;

an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit; and a recording apparatus including an audio input terminal for inputting the audio signal outputted from the audio receiving apparatus, wherein the audio transmitting apparatus includes a connection terminal for connecting a human interface device and a data transmitting unit for transmitting, as radio waves, data corresponding to an operation of the human interface device connected to the connection terminal, the audio receiving apparatus includes a first communication terminal and a data processing unit for obtaining the data from the received radio waves and outputting a control signal corresponding to the data from the first communication terminal, and the recording apparatus includes a second communication terminal for inputting the control signal outputted from the first communication terminal of the audio receiving apparatus and a control unit for controlling an inside of the recording apparatus in accordance with the control signal inputted into the second communication terminal.

3. A wireless audio transfer system comprising:

an audio transmitting apparatus including a microphone and a modulating/transmitting unit for transmitting radio waves modulated using an audio signal from the microphone;

an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit; and an audio mixer including an audio input terminal for inputting the audio signal outputted from the audio output terminal of the audio receiving apparatus, wherein the audio transmitting apparatus includes a connection terminal for connecting a human interface device and a data transmitting unit for transmitting, as radio waves, data corresponding to an operation of the human interface device connected to the connection terminal, the audio receiving apparatus includes a first communication terminal and a data processing unit for obtaining the data from the received radio waves and outputting a control signal corresponding to the data from the first communication terminal, and the audio mixer includes a second communication terminal for inputting the control signal outputted from the first communication terminal of the audio receiving apparatus and a control unit for controlling an inside of the audio mixer in accordance with the control signal inputted into the second communication terminal.

4. A wireless microphone comprising:

an audio transmitting apparatus including a microphone and a modulating/transmitting unit for transmitting radio waves modulated using an audio signal from the microphone; and an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit, wherein the audio transmitting apparatus includes a connection terminal for connecting a human interface device and a data transmitting unit for transmitting, as radio waves, data corresponding to an operation of the human interface device connected to the connection terminal, and the audio receiving apparatus includes a communication terminal and a data processing unit for obtaining the data from the received radio waves and outputting a control signal corresponding to the data from the communication terminal.

5. A wireless microphone according to claim 4, wherein the audio transmitting apparatus includes an analog/digital converting circuit that carries out analog/digital conversion on the audio signal from the microphone and supplies the converted audio signal to the modulating/transmitting unit, the data transmitting unit of the audio transmitting apparatus includes:

a first control circuit for generating control data corresponding to an operation of the human interface device connected to the connection terminal; and an appending circuit for appending the control data generated by the first control circuit to a digital audio signal outputted from the analog/digital converting circuit, and the data processing unit of the audio receiving apparatus includes:

an extracting circuit for extracting the control data from the digital audio signal demodulated by the receiving/demodulating unit; and a second control circuit for outputting a control signal, which corresponds to the control data extracted by the extracting circuit, from the communication terminal.

6. A wireless microphone according to claim 4, wherein the data transmitting unit of the audio transmitting apparatus includes:

a tone signal generating circuit;

a first control circuit for causing the tone signal generating circuit to generate a tone signal corresponding to an operation of the human interface device connected to the connection terminal; and an adding circuit for superimposing the tone signal generated by the tone signal generating circuit onto the audio signal from the microphone, and the data processing unit of the audio receiving apparatus includes:

a tone signal detecting circuit for detecting the tone signal from the audio signal demodulated by the receiving/demodulating unit; and a second control circuit for outputting a control signal, which corresponds to the tone signal detected by the tone signal detecting circuit, from the communication terminal.

7. A wireless microphone according to claim 4, wherein the data transmitting unit of the audio transmitting apparatus includes:

a first control circuit for generating data corresponding to an operation of the human interface device connected to the connection terminal; and a second modulating/transmitting unit for modulating radio waves of a different frequency band to a transmission frequency of the audio signal from the microphone using the data from the first control circuit and transmitting the modulated radio waves, and the data processing unit of the audio receiving apparatus includes:

a second receiving/demodulating unit for receiving the radio waves transmitted from the second modulating/transmitting unit of the audio transmitting circuit and demodulating the data; and a second control circuit that outputs a control signal, which corresponds to the data demodulated by the second receiving/demodulating unit, from the communication terminal.

* * * * *